US012641019B2

(12) United States Patent
Alaettinoglu et al.

(10) Patent No.: US 12,641,019 B2
(45) Date of Patent: ***May 26, 2026

(54) CIRCUIT STYLE SEGMENT ROUTING POLICIES WITH COMPRESSED SID LIST

(71) Applicant: Ciena Corporation, Hanover, MD (US)

(72) Inventors: Cengiz Alaettinoglu, Sherman Oaks, CA (US); Amal Karboubi, Oshawa (CA); Himanshu Shah, Hopkinton, MA (US); Muthurajah Sivabalan, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,272

(22) Filed: Jan. 9, 2024

(65) Prior Publication Data

US 2024/0146648 A1    May 2, 2024

Related U.S. Application Data

(63) Continuation of application No. 17/709,290, filed on Mar. 30, 2022, now Pat. No. 11,882,032, which is a continuation-in-part of application No. 17/489,979, filed on Sep. 30, 2021, now Pat. No. 11,757,757.

(51) Int. Cl.
| | |
|---|---|
| *H04L 45/645* | (2022.01) |
| *H04L 43/0811* | (2022.01) |
| *H04L 45/28* | (2022.01) |

(52) U.S. Cl.
CPC ........ *H04L 45/645* (2022.05); *H04L 43/0811* (2013.01); *H04L 45/28* (2013.01)

(58) Field of Classification Search
CPC ..... H04L 45/646; H04L 43/0811; H04L 45/28
USPC ........................................................... 370/225
See application file for complete search history.

(56) References Cited

U.S. PATENT DOCUMENTS

| | | | | |
|---|---|---|---|---|
| 2008/0253295 A1* | 10/2008 | Yumoto | ................ | H04L 45/245 370/245 |
| 2015/0222640 A1* | 8/2015 | Kumar | .................. | H04L 47/125 370/230 |
| 2016/0173366 A1* | 6/2016 | Saad | ........................ | H04L 45/50 370/389 |

(Continued)

OTHER PUBLICATIONS

C. Schmutzer et al., Network Working Group, "Circuit Style Segment Routing Policies," Internet-Draft, Sep. 30, 2021, pp. 1-15.

(Continued)

*Primary Examiner* — Hermon Asres
(74) *Attorney, Agent, or Firm* — Baratta Law PLLC; Lawrence A. Baratta, Jr.

(57) ABSTRACT

A head-end node in a Segment Routing network includes circuitry configured to detect a failure of a Segment Routing policy, set an eligibility flag for the candidate path associated with the Segment Routing policy to false, and, if one or more other candidate paths exist for the Segment Routing policy, switch to another candidate path of the one or more other candidate paths considering corresponding eligibility flags for the one or more other candidate paths. The eligibility flag and the corresponding eligibility flags are maintained by the head-end node for the candidate path and the one or more other candidate paths such that the head-end node selects a path based thereon.

18 Claims, 10 Drawing Sheets

(56)                References Cited

U.S. PATENT DOCUMENTS

2017/0093732  A1*    3/2017   Akhavain Mohammadi ...............
                                                         H04L 45/38
2019/0158406  A1*    5/2019   LaBerge  ................. H04L 47/13
2021/0392072  A1*   12/2021   Bidgoli  .................. H04L 45/24

OTHER PUBLICATIONS

C. Schmutzer et al., Network Working Group, "Circuit Style Seg-
ment Routing Policies," Internet-Draft, Mar. 7, 2022, pp. 1-17.
A. Boutros et al., "Service Redundancy using BFD; draft-adubey-
bfd-service-redundancy-03.txt," BFD Workgroup, Internet-draft, Stan-
dard Tracks, Jan. 24, 2020, 6 pages.
C. Schmutzer et al., "Circuit Style Segment Routing Policies;
draft-schmutzer-pce-cs-sr-policy-01," Network Working Group, Internet-
Draft, Informational, Mar. 7, 2022, 15 pages.
Jul. 18, 2023, European Search Report issued for European Patent
Application No. EP 23 16 3570.

* cited by examiner

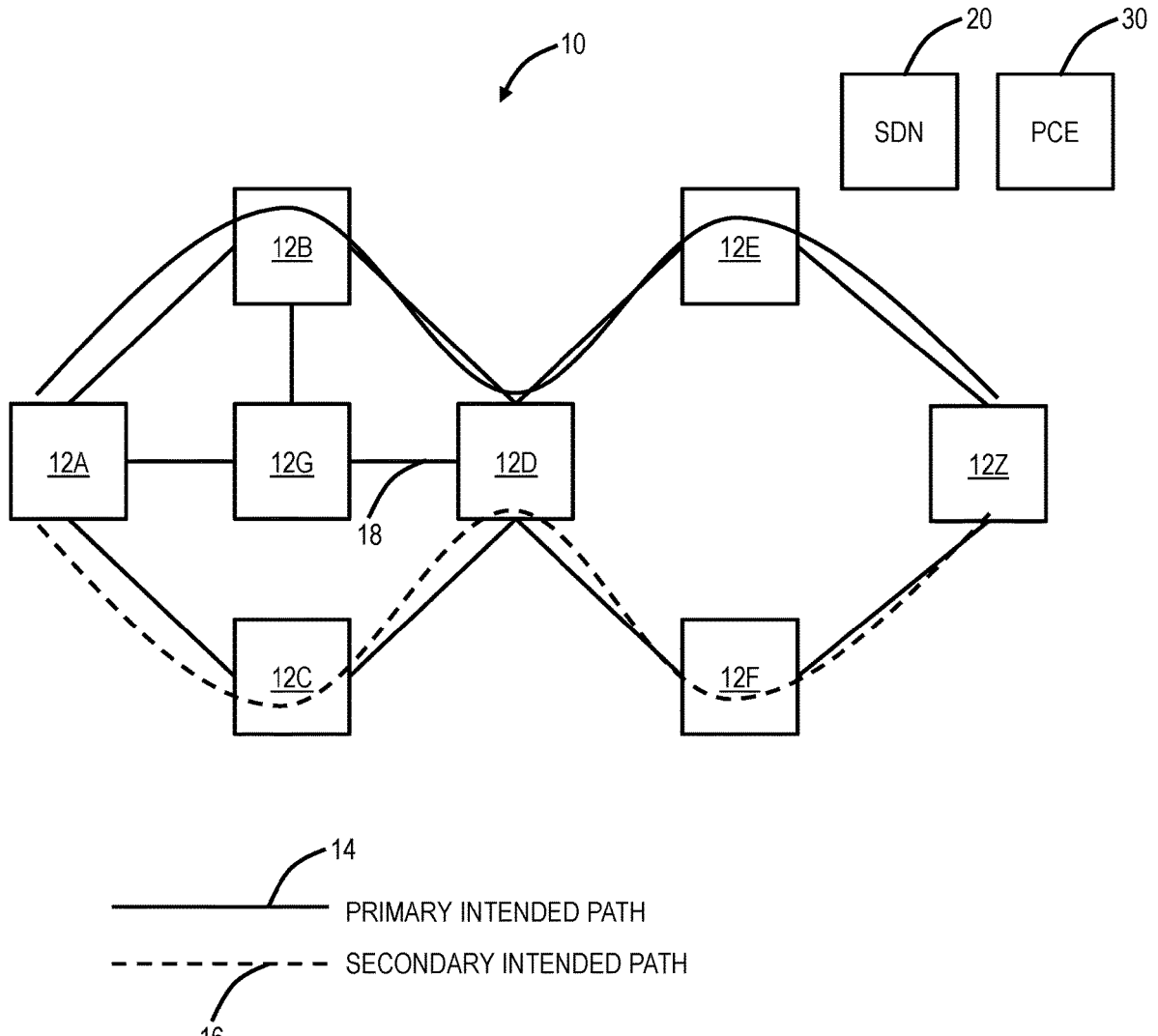
PRIMARY INTENDED PATH
SECONDARY INTENDED PATH
_FIG. 1_

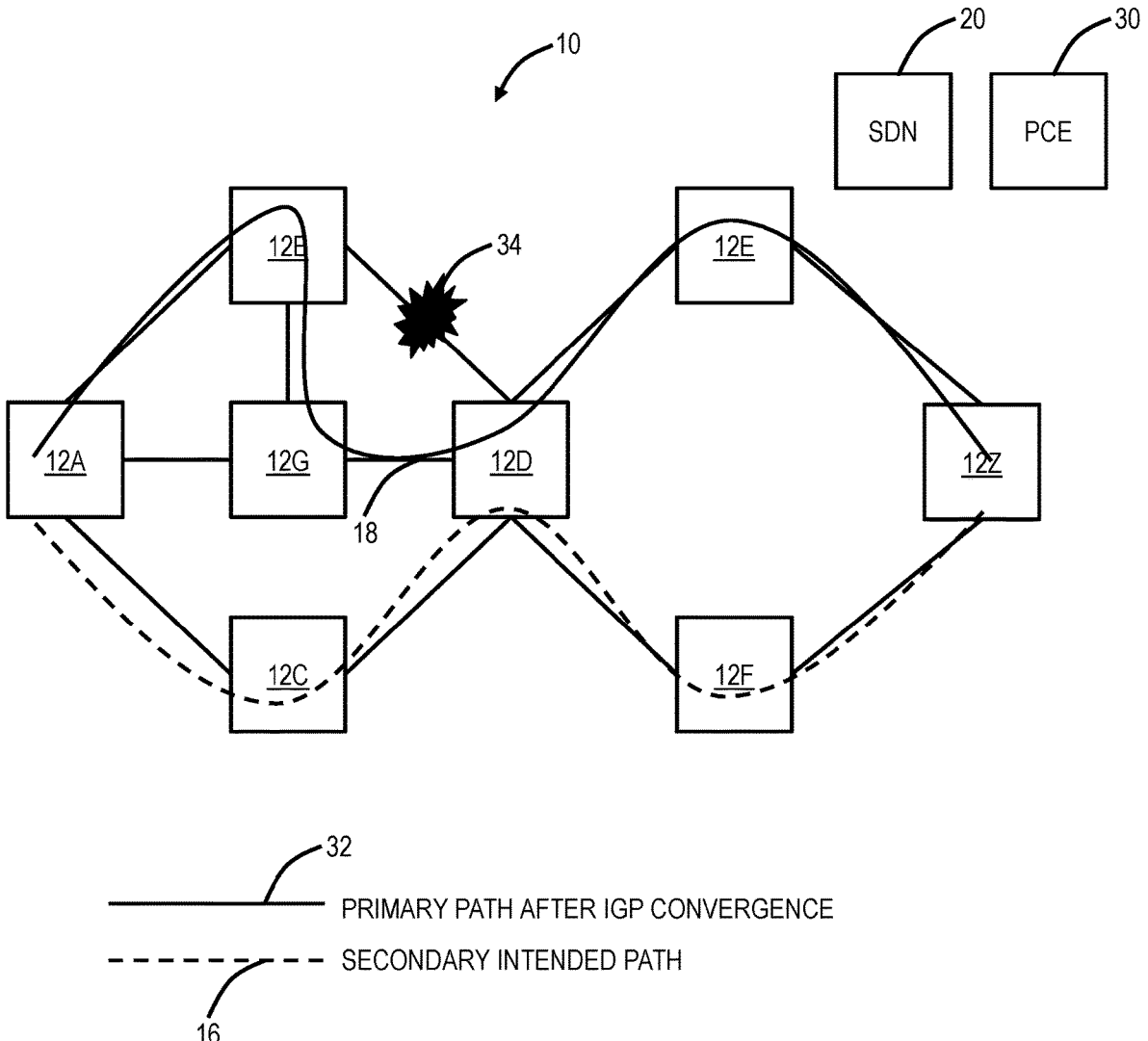
_FIG. 2_

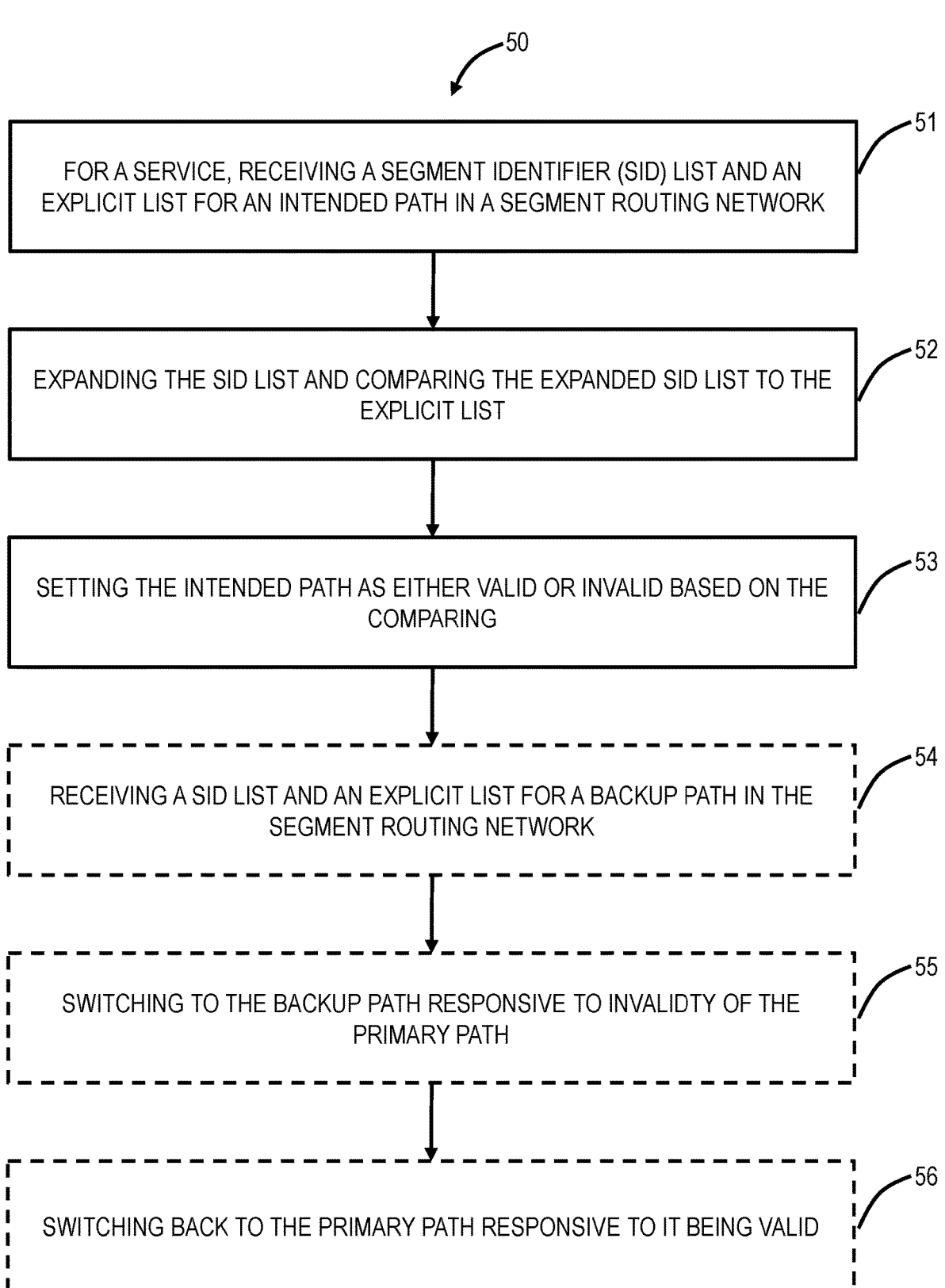

50

51
FOR A SERVICE, RECEIVING A SEGMENT IDENTIFIER (SID) LIST AND AN EXPLICIT LIST FOR AN INTENDED PATH IN A SEGMENT ROUTING NETWORK

52
EXPANDING THE SID LIST AND COMPARING THE EXPANDED SID LIST TO THE EXPLICIT LIST

53
SETTING THE INTENDED PATH AS EITHER VALID OR INVALID BASED ON THE COMPARING

54
RECEIVING A SID LIST AND AN EXPLICIT LIST FOR A BACKUP PATH IN THE SEGMENT ROUTING NETWORK

55
SWITCHING TO THE BACKUP PATH RESPONSIVE TO INVALIDTY OF THE PRIMARY PATH

56
SWITCHING BACK TO THE PRIMARY PATH RESPONSIVE TO IT BEING VALID

_FIG. 4_

INTENDED PATH = OPTIMUM PATH = PROVISIONED PATH =  [A, B, D, E, Z]

SID LIST = [B, E, Z]

INTENDED PATH = [A, B, D, E, Z]
PROVISIONED PATH = [A, B, D, E, Z]
CURRENT PATH = [A, C, D, B, D, E, Z] FOR OLD SID LIST [B, E, Z]
NEW OPTIMUM PATH = [A, D, E, Z]
INTENDED PATH STAYS THE SAME
NEW PROVISIONED PATH = [A, D, E, Z]
NEW SID LIST = [A-D ADJACENCY, E, Z]
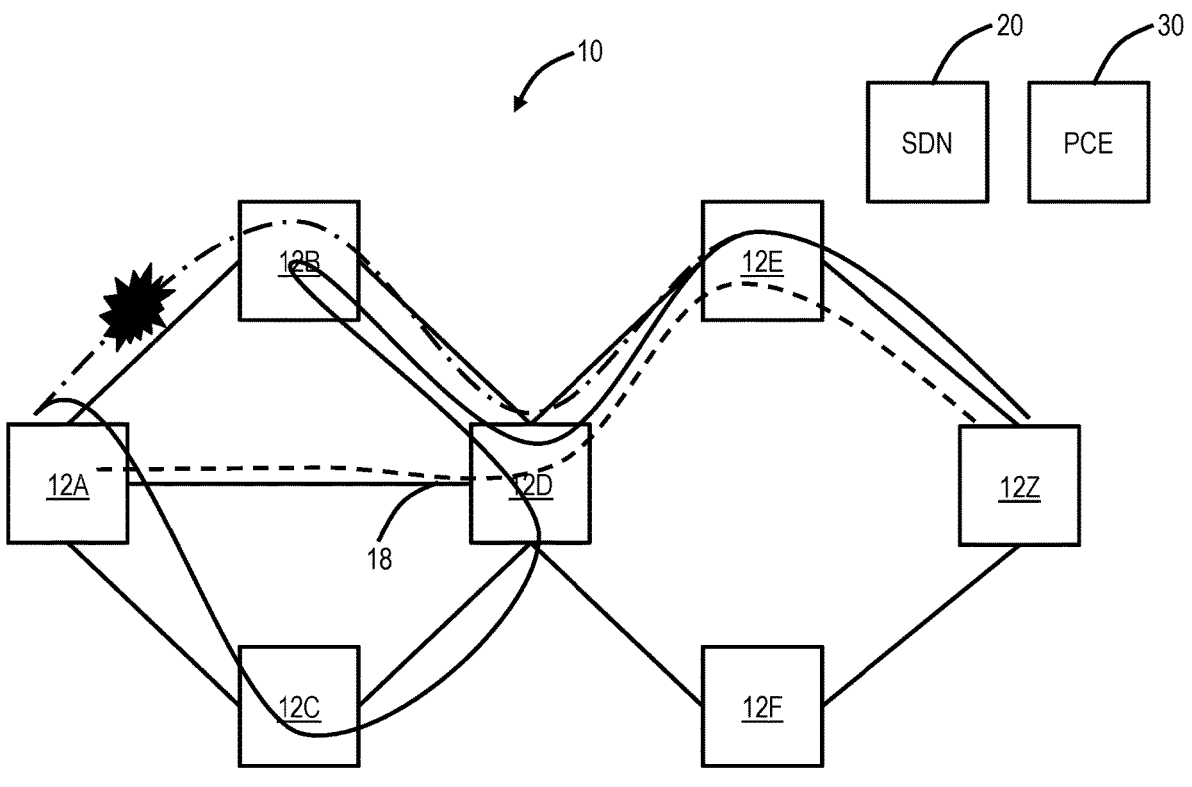
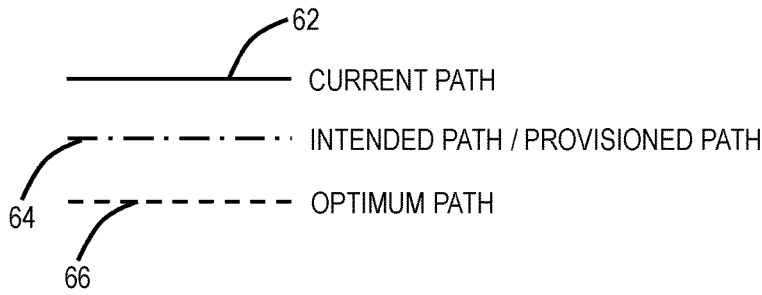
_FIG. 6_

INTENDED PATH = [A, B, D, E, Z]
OPTIMUM PATH, PROVISIONED PATH DO NOT CHANGE AND ARE THE
SAME AS THE INTENDED PATH
CURRENT PATH = [A, B, E, Z] FOR OLD SID LIST [B, E, Z]
NEW SID LIST = [B, D, E, Z]

OLD INTENDED PATH = [A, B, D, E, Z]
NEW OPTIMUM PATH = [A, B, D, Z]
NEW INTENDED PATH = NEW OPTIMUM PATH
NEW PROVISIONED PATH = OPTIMUM PATH
NEW SID LIST = [B, Z]
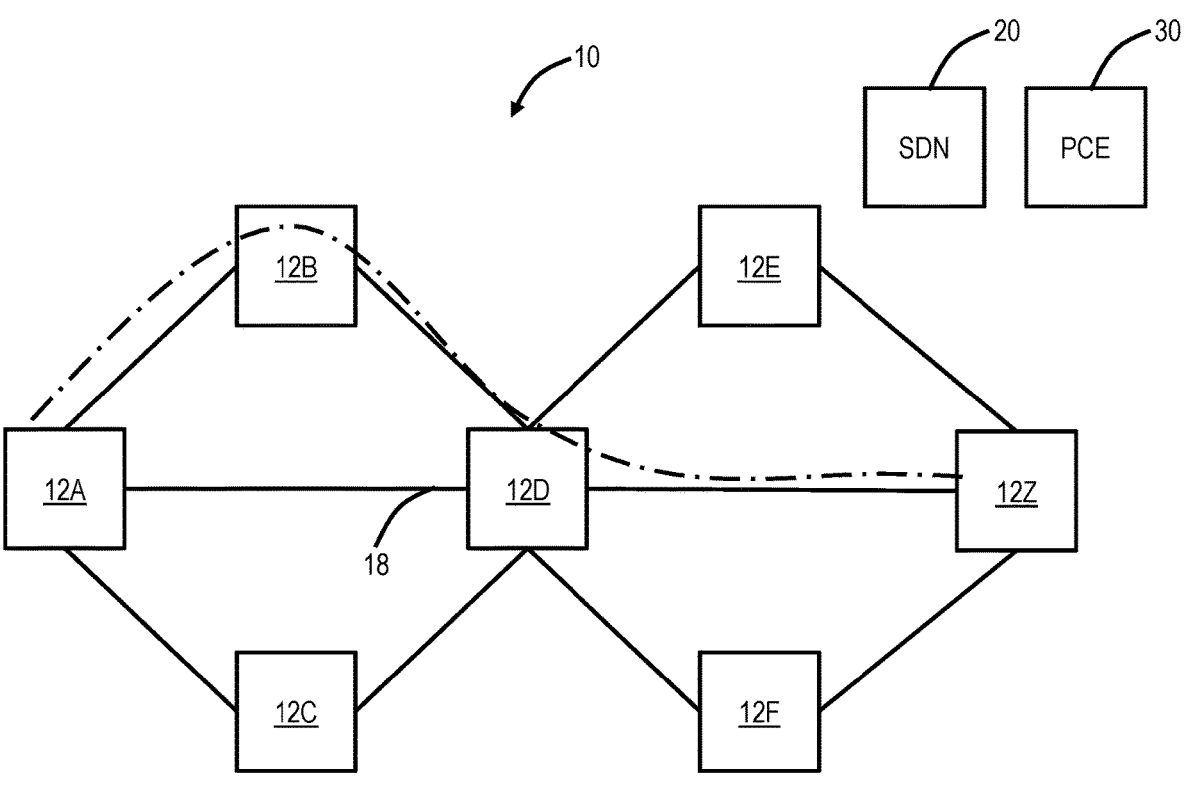
NEW OPTIMUM PATH / INTENDED PATH / PROVISIONED PATH
*FIG. 8*

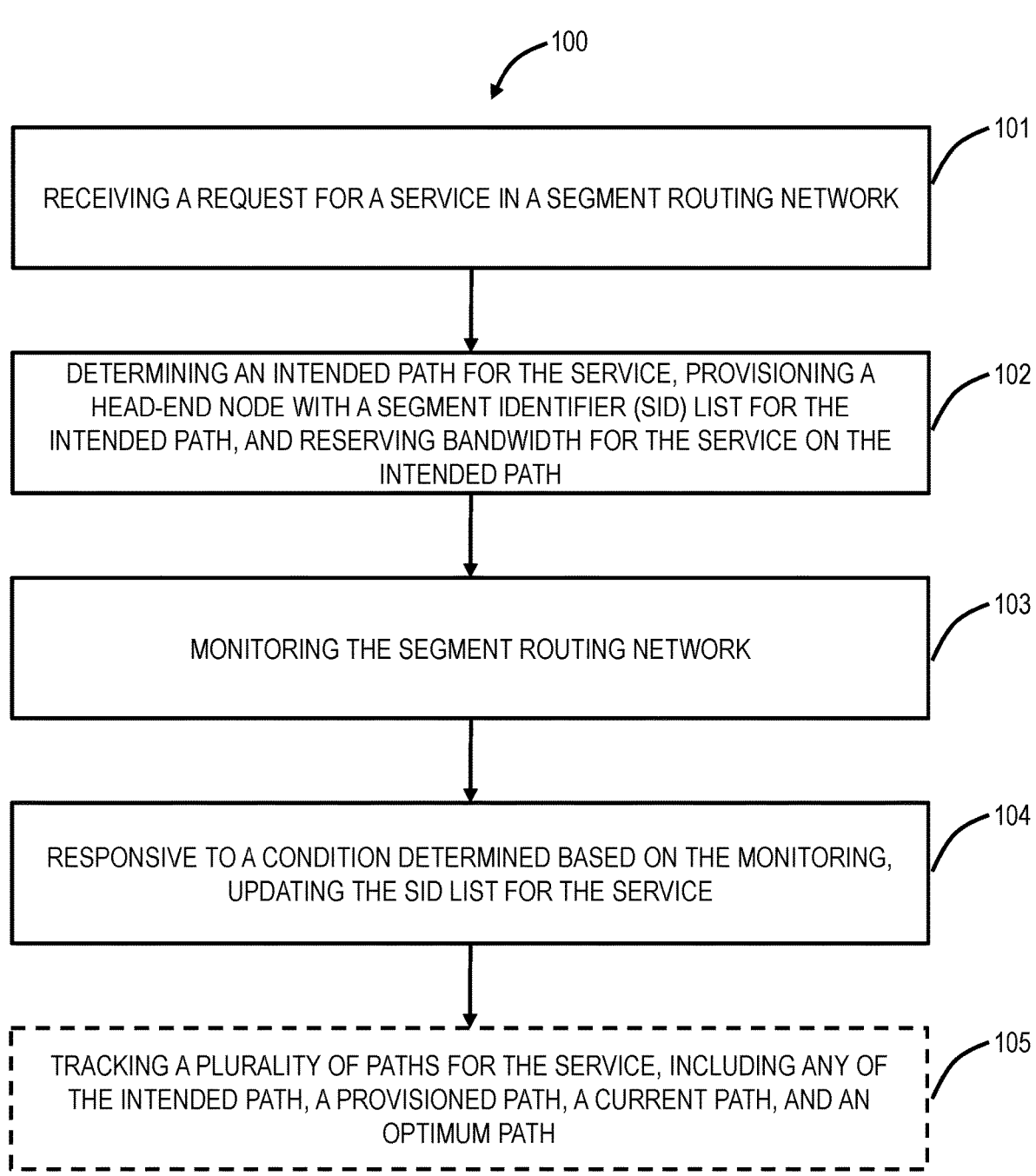

100

RECEIVING A REQUEST FOR A SERVICE IN A SEGMENT ROUTING NETWORK
101

DETERMINING AN INTENDED PATH FOR THE SERVICE, PROVISIONING A HEAD-END NODE WITH A SEGMENT IDENTIFIER (SID) LIST FOR THE INTENDED PATH, AND RESERVING BANDWIDTH FOR THE SERVICE ON THE INTENDED PATH
102

MONITORING THE SEGMENT ROUTING NETWORK
103

RESPONSIVE TO A CONDITION DETERMINED BASED ON THE MONITORING, UPDATING THE SID LIST FOR THE SERVICE
104

TRACKING A PLURALITY OF PATHS FOR THE SERVICE, INCLUDING ANY OF THE INTENDED PATH, A PROVISIONED PATH, A CURRENT PATH, AND AN OPTIMUM PATH
105

*FIG. 9*

CIRCUIT STYLE SEGMENT ROUTING POLICIES WITH COMPRESSED SID LIST

CROSS-REFERENCE TO RELATED APPLICATION(S)

The present disclosure is a continuation of U.S. patent application Ser. No. 17/709,290, filed Mar. 30, 2023, which is a continuation-in-part of U.S. patent application Ser. No. 17/489,979, filed Sep. 30, 2021, now U.S. Pat. No. 11,757, 757, issued Sep. 12, 2023, the contents of each are incorporated by reference in their entirety.

FIELD OF THE DISCLOSURE

The present disclosure generally relates to networking. More particularly, the present disclosure relates to systems and methods for emulating Multiprotocol Label Switching-Transport Profile (MPLS-TP) behavior with non-revertive candidate paths in Segment Routing.

BACKGROUND OF THE DISCLOSURE

Service providers offer Service Level Agreements (SLAs) to their customers. To satisfy these SLAs, a service provider needs to reserve capacity on the links the customer's traffic flows over. For each service request, the service provider searches for paths that satisfy that service's intent and have sufficient capacity. As it provisions services, the service provider needs to keep track of the available capacity on the links so that future requests do not overcrowd the links and impact SLA guarantees of other customers. This is usually done for each Class of Service (CoS) independently.

One such approach for capacity (bandwidth) reservation is RSVP-TE. With RSVP-TE, a head-end router as well as intermediate routers are stateful and aware of bandwidth demands at every single point. A RSVP-TE head-end router would never use a current Path that breaks the user intent. With Segment Routing, by using compressed SID list, the current path may break the user intent. There is a need to address bandwidth reservation in Segment Routing. The problem space for Segment Routing is different and more complicated from the space for RSVP-TE due to the current path's ability to diverge from the intended path. This does not happen with RSVP-TE.

Also, network operators or service providers can offer diverse path services to customers for extra resiliency. Existing approach for an end-to-end diverse path service use Multiprotocol Label Switching-Transport Profile (MPLS-TP), which in turn utilizes Resource Reservation Protocol-Traffic Engineering (RSVP-TE). Segment Routing (SR) introduces new challenges for providing diverse paths. A valid SR path may diverge from the path a PCE computed and consume resources on routers and links it was not meant to. With Segment Routing, because of the on-router computation of shortest paths, a service's current path and intended path may deviate after some link or router failures and/or repairs. One way to fix this problem is for a PCE to signal a new Segment Identifier (SID) list when this happens. However, this usually takes tens of seconds. There is a need to support diversity constraints with Segment Routing.

BRIEF SUMMARY OF THE DISCLOSURE

The present disclosure relates to systems and methods for emulating Multiprotocol Label Switching-Transport Profile (MPLS-TP) behavior with non-revertive candidate paths in Segment Routing. Segment Routing (SR) introduces new challenges for keeping signaled paths (Candidate Paths in SR Policy) on their intended paths (the path the PCE computed and made bandwidth reservations). This is because the SID list is compressed, and routers determine the full set of links along the path in a distributed fashion. Hence, the currently expanded path of an SR Candidate Path may deviate from the path the PCE intended as the network topology changes due to failures and repairs.

U.S. patent application Ser. No. 17/489,979, the parent application of the present disclosure, addresses these issues on the PCE. The present disclosure provides an approach that utilizes routing control plane features, such as on a network element along with new PCE behavior.

The present disclosure provides a clear migration from MPLS-TP to Segment Routing.

Also, the present disclosure relates to systems and methods for handling bandwidth reservations with Segment Routing and a centralized Path Computation Element (PCE) under real-time topology changes. The present disclosure includes a PCE that allocates bandwidth to services using Segment Routing. The PCE keeps track of changes in the network and ensures the segments configured for a service match the intended path of the service and looks for optimization opportunities for the intended path. This approach works across Interior Gateway Protocol (IGP) areas and Border Gateway Protocol (BGP) autonomous systems. The PCE guarantees a service's path, after a sequence of link failures and repairs, and after all the failures are repaired, is at least as good as its initial path. So, even though the path may degrade during failures, it can only improve after the repairs. To address the new issue brought on by Segment Routing (which relies on best path computation between SID hops and the fact that current path may now take undesired path), the PCE tracks changes in the network, assessing any changes to current Segment Routing policies and reacts accordingly by computing new paths and/or computing new SID lists.

Also, the present disclosure relates to systems and methods for handling diversity constraints with Segment Routing and a centralized Path Computation Element (PCE). Specifically, a head-end router using the approach described herein can keep traffic either on the intended primary or intended secondary path where Traffic Engineering (TE) constraints (such as bandwidth, affinity, delay, etc.) are guaranteed, but not on unintended paths which may not respect the user provided constraints. The present disclosure includes signals both the compressed SID list and the intended full path (similar to an RSVP-TE Explicit Route Object (ERO)) and changes the validity rule for an SR Policy at the head-end router. The compressed SID list, when expanded by the head-end router, may or may not be identical to the intended path as the network topology changes. The candidate path is now considered invalid when this expansion is not identical to the explicitly specified intended path.

In various embodiments, a method having steps implemented by a network element, a network element configured to implement the steps, and a non-transitory computer-readable medium includes instructions stored thereon for programming a network element are disclosed. The steps include receiving a request for a service in a Segment Routing network; determining an intended path for the service; provisioning a head-end node with a Segment Identifier (SID) list for the intended path, and reserving bandwidth for the service on the intended path; monitoring the Segment Routing network; and responsive to a condition determined based on the monitoring, updating the SID list for the service.

The condition can include a current path for the service in the Segment Routing network differing from a provisioned path in the Segment Routing network. The condition can include any of a failure in the Segment Routing network, a topology change in the Segment Routing network, bandwidth changes in the Segment Routing network, an optimization timer, and input from an operator. The steps can further include tracking a plurality of paths for the service, including any of the intended path, a provisioned path, a current path, and an optimum path. At service creation, all of the plurality of paths are the same. Responsive to the optimum path being better than the intended path, the steps can further include changing both the provisioned and the intended path to the optimum path, and computing a new SID list; and updating the reserved bandwidth.

Responsive to the optimum path being worse than the intended path, the steps can further include maintaining the reserved bandwidth on the intended path; and setting a provisioned path to the optimum path with a corresponding SID list with bandwidth reservation on the set provisioned path. Responsive to the optimum path being the same as the intended path with the provisioned path being different, the steps further can include removing reserved bandwidth on the provisioned path and changing the provisioned path to the intended path and updating a new SID list for this new provisioned path. Responsive to the current path being different from the provisioned path, the steps can further include determining a new SID list for the provisioned path.

Also, the steps can include, for a service, receiving a Segment Identifier (SID) list and an explicit list for an intended path in a Segment Routing network; expanding the SID list and comparing the expanded SID list to the explicit list; and setting the intended path as either valid or invalid based on the comparing. The intended path can be a primary path, and the steps can further include receiving a SID list and an explicit list for a backup path in the Segment Routing network. The steps can further include switching to the backup path responsive to invalidity of the primary path; and switching back to the primary path responsive to it being valid. The receiving can be from a Path Computation Element (PCE). The receiving can be by the network element which is a head-end router for the service. The SID list can be compressed, and the explicit list can include every network element for the intended path. The intended path can be valid when the expanded SID matches the explicit list.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a network diagram of a network including network elements illustrating paths at service creation.

FIG. 2 is a network diagram of the network illustrating a primary path that diverges from the intended primary path after a IGP convergence after a link failure.

FIG. 4 is a flowchart of a process implemented in a network element.

FIG. 6 is a network diagram of the network illustrating path divergence after a failure on the provisioned path.

FIG. 8 is a network diagram of the network illustrating a better intended path after a link addition.

FIG. 9 is a flowchart of a process implemented in a controller or PCE for Segment Routing bandwidth reservation.

DETAILED DESCRIPTION OF THE DISCLOSURE

Figure 3:
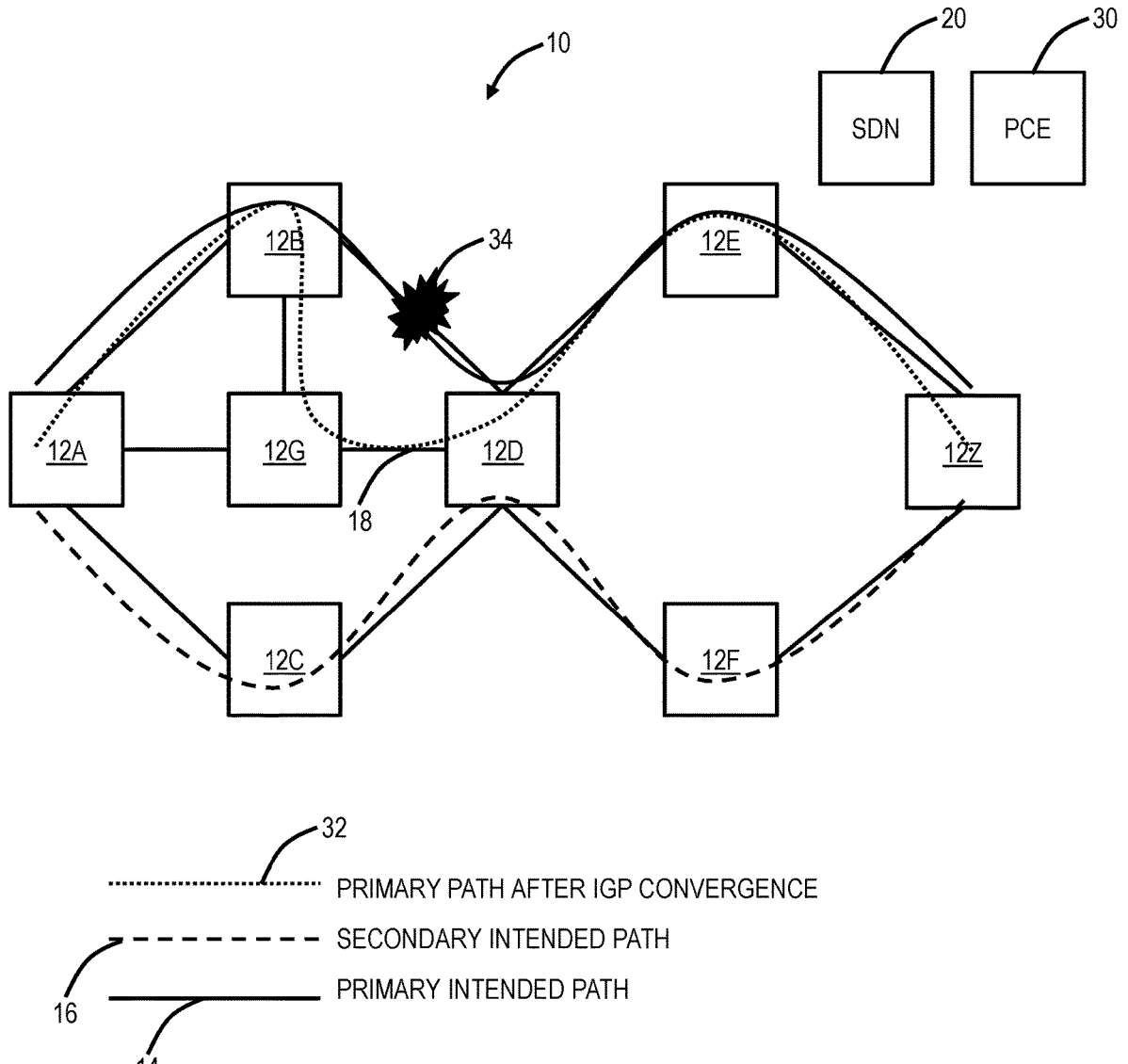
FIG. 3 is a network diagram of the network illustrating expansion of the SID list to detect divergence from the intended path.

Again, the present disclosure relates to systems and methods for emulating Multiprotocol Label Switching-Transport Profile (MPLS-TP) behavior with non-revertive candidate paths in Segment Routing. Segment Routing (SR) introduces new challenges for keeping signaled paths (Candidate Paths in SR Policy) on their intended paths (the path the PCE computed and made bandwidth reservations). This is because the SID list is compressed, and routers determine the full set of links along the path in a distributed fashion. Hence, the currently expanded path of an SR Candidate Path may deviate from the path the PCE intended as the network topology changes due to failures and repairs. The present disclosure provides an approach that utilizes routing control plane features, such as on a network element along with new PCE behavior.

Again, the present disclosure relates to systems and methods for handling bandwidth reservations with Segment Routing and a centralized Path Computation Element (PCE) under real-time topology changes. The present disclosure includes a PCE that allocates bandwidth to services using Segment Routing. The PCE keeps track of changes in the network and ensures the segments configured for a service match the intended path of the service and looks for optimization opportunities for the intended path. This approach works across Interior Gateway Protocol (IGP) areas and Border Gateway Protocol (BGP) autonomous systems. The PCE guarantees a service's path, after a sequence of link failures and repairs, and after all the failures are repaired, is at least as good as its initial path. So, even though the path may degrade during failures, it can only improve after the repairs. To address the new issue brought on by Segment Routing (which relies on best path computation between SID hops and the fact that current path may now take undesired path), the PCE tracks changes in the network, assessing any changes to current Segment Routing policies and reacts accordingly by computing new paths and/or computing new SID lists.

This present disclosure is based on a reactive model approach, i.e., detecting path changes which may violate SLAs and adjust the paths accordingly. There will be a time between the controller detecting a potential issue and taking corrective action to address it where traffic may be going on undesired path. However, this is also a currently adopted/accepted behavior in Internet Protocol (IP) networks and even for RSVP-TE.

Also, the present disclosure relates to systems and methods for handling diversity constraints with Segment Routing and a centralized Path Computation Element (PCE). Specifically, a head-end router using the approach described herein can keep traffic either on the intended primary or intended secondary path where Traffic Engineering (TE) constraints (such as bandwidth, affinity, delay, etc.) are guaranteed, but not on unintended paths which may not respect the user provided constraints. The present disclosure includes signals both the compressed SID list and the intended full path (similar to an RSVP-TE Explicit Route Object (ERO)) and changes the validity rule for an SR Policy at the head-end router. The compressed SID list, when expanded by the head-end router, may or may not be identical to the intended path as the network topology changes. The candidate path is now considered invalid when this expansion is not identical to the explicitly specified intended path.

Segment Routing Overview

In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each segment is represented by a Segment Identifier (SID).

In SR-MPLS, all SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SR-MPLS, SRGB is a local property of a node and identifies the set of local labels reserved for global segments. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by Open Shortest Path First (OSPF) or Intermediate System-Intermediate System (ISIS)). The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by an adjacency SID, which represents a specific adjacency, such as egress interface, to a neighboring router. The adjacency SID is distributed by ISIS or OSPF. The adjacency segment steers the traffic to a specific adjacency.

An anycast segment is a type of prefix segment that represents an anycast group. An anycast segment/SID is used for policies or protection. When forwarding traffic to an anycast SID, a node processing the forwarding will pick a device from the anycast group, which is the closest. If the closest device from the anycast group goes away, traffic will automatically switch to the next closest device in the anycast group. An anycast SID also enables load balancing and Equal Cost Multipath (ECMP).

SR-MPLS utilizes MPLS labels for the SID, whereas SRv6 utilizes an IPv6 address for a SID, i.e., when an SRv6 SID is in the Destination Address field of an IPv6 header of a packet, it is routed through an IPv6 network as an IPv6 address. Note, various example embodiments described herein are presented with reference to SR-MPLS, but those skilled in the art will recognize SRv6 is also contemplated.

Example Network

FIG. 1 is a network diagram of a network 10 including network elements 12A, 12B, 12C, 12D, 12E, 12F, 12G, 12Z illustrating paths 14, 16 at service creation. As described herein, the network elements 12 can be nodes, switches, routers, etc. implementing Segment Routing. In this example, for illustration purposes, it is assumed all link metrics or costs are equal, and every link 18 has sufficient bandwidth for the service, except the link 18 between the network elements 12D, 12G.

A diverse-path service request, along with the bandwidth reservation and other constraints, can be made via a northbound interface to a Software Defined Networking (SDN) controller 20 such as via a Network Management System (NMS). The SDN controller manages the lifecycle of these services. The SDN controller 20 can host a PCE 30 and track available bandwidth and other TE link characteristics on a model of the network topology it maintains. Using this model, a PCE 30 computes two (or more) paths 14, 16 for the service that satisfy the service's intent (e.g., have sufficient capacity) and are diverse from each other. Usually, one of these paths is the primary path 14 and the rest are backup paths. We do not describe multiple backup paths any further; but the present disclosure applies to both single and multiple backup paths.

The present disclosure also applies when the path computation is done by the head-end routers, e.g., the network element 12A, and the term head-end router is interchangeable with head-end node. In this case, some constraints are not possible (e.g., bandwidth reservation). For illustration purposes, we only describe the present disclosure using a PCE for brevity.

These initial paths 14, 16 are optimum with respect to the service intent at the time of their computation; that is, the PCE 30 computes the best paths available according to the network state and available capacity at that time. We call these the intended paths 14, 16 of the service. The service will be placed on one of these paths referred to as the primary path 14 and the other will serve as a backup path 16 when a failure on the primary path 14 is detected. The failure can be detected using standard Interior Gateway Protocol (IGP) (such as Open Shortest Path First (OSPF) and Intermediate System-Intermediate System (ISIS)) mechanisms or using an Operations, Administration, and Maintenance (OAM) protocol such a Bidirectional Forwarding Detection (BFD). Also, failure is one condition, but invalidity of primary path can occur even without failure, e.g., a shorter path because of a repair or new link that satisfies the compressed SID list but is not same at intended path. Thus, invalidity includes the failure of the path as well as other conditions.

The SDN controller 20 then converts these paths into an SR Policy object as defined in Segment Routing Policy Architecture, draft-ietf-spring-segment-routing-policy-08, Jul. 7, 2020, available online at datatrackeriettorg/doc/html/draft-ietf-spring-segment-routing-policy-08, the contents of which are incorporated by reference in their entirety. The SR Policy object has the following rough structure:

```
Destination prefix, color
    Candidate path 1 (preference 1)
        SID list 1
        SID list 2
        SID list n
    Candidate path 2 (preference 2)
        SID list 1
        SID list 2
        SID list n
    Candidate path 3 (preference 3)
        SID list 1
        SID list 2
        SID list n
```

The destination is typically the egress router of the traffic, namely the network element 12Z. Color represents a service type and allows specifying a distinct path for that type (e.g., color 10 can indicate a low delay path). Color is not relevant to the present disclosure and is not further discussed. Per the specification, a router uses the first candidate path that is valid (correctly specified and available according to network's routing) and has the highest preference. Each of the SID list under a candidate path describes an SR-encoded path. A candidate path as a result is a collection of paths and the traffic is split either equally or unequally among them according to policy (not shown here).

For our diverse path application, the SDN controller 30 converts the two intended paths 14, 16 it computed into two SID lists and places them under two candidate paths as follows:

```
Destination prefix, color x
    Candidate path 1 preference 100
        SID list for primary path
    Candidate path 2 preference 50
        SID list for backup path
```

Each SID list is compressed in that it does not fully specify the path. In the most compressed case, it may use just a single SID for the tail-end of the service. In the most complete case, it can list every router and the link along the path. The latter is often not feasible due to the hardware limitations of routers. As a result, the compressed SID list ends up explicitly encoding some of the nodes and/or links of the path and implicitly specifying the nodes and/or links in between these explicit pieces. As described herein, a compressed SID list can include any of prefix SIDs, node SIDs, and anycast SIDs. The implicit pieces are the shortest paths according to network's routing between the explicit pieces. The implicit pieces are the segments in the name segment routing. The compressed SID list is computed by controller 30 so that, running shortest path between these SIDs will guarantee that path chosen by routers will be same as the intended path 14, 16.

To encode the SID list, the SDN controller 20 needs to know the network topology and shortest path behavior to the same level of detail as the routers. To do this, it needs to participate in network's routing, such as ISIS and OSPF, and implement the same path computation as the routers do. ISIS and OSPF topology can also be learned indirectly via another routing protocol, for example by using the link state address family in BGP. The implementation described herein allows either approach.

The SDN controller 20 then installs this SR Policy object to the head-end router of the service using either a Command Line Interface (CLI), Netconf/Yang, or a signaling protocol such as Path Computation Element Communications Protocol (PCEP).

Note that the head-end router (the network element 12A) is only aware of the two SID lists, not the actual intended paths 14, 16. The head-end router will compute the path of the first segment, i.e., the shortest path to the first SID in the first valid candidate path, and send the service's packets on this path. The packets include the remainder of the SID list. The router at the other end of that segment repeats the process for the next segment until all the SID list is exhausted.

FIG. 1 illustrates example diverse paths 14, 16 for a service from node A to Z. In this example, the path 14 includes a SID list for the network elements 12B, 12E, 12Z, and the path 16 includes a SID list for the network elements 12C, 12F, 12Z.

Path Deviation

Because of the on-router computation of shortest paths, the service's current path and intended path 14, 16 may deviate after some link or router failures and/or repairs. This can happen as a result of a link or a router failure on the intended path, or without any failure on the intended path as well.

FIG. 2 is a network diagram of the network 10 illustrating a primary path 32 that diverges from the intended primary path 14 after a IGP convergence after a link failure 34. Here, the sequence events are described when the link between network elements 12B, 12D fails. Assume the network element 12A uses BFD for fast failure detection.

1) BFD detects that the candidate path 14 failed.

2) the network element 12A switches to the candidate path 16 (backup path).

3) the network element 12B detects the link between network elements 12B, 12D has failed (this can be detected before, after, or at the same time as 1; but it does not matter for our discussion) and may run Topology-Independent Loop-Free Alternate (TI-LFA), if applicable.

4) the network element 12B floods in IGP that the link between network elements 12B, 12D has failed.

5) the network elements 12A, 12B run Shortest Path First (SPF) again with the link between network elements 12B, 12D.

6) the network element 12A concludes candidate path 32 is still valid but is now expanding to network elements 12A, 12B, 12G, 12D, 12E, 12Z.

7) the service switches back to candidate path 32 (primary) which is not the intended primary path 14 in FIG. 1.

The step 7) creates a problem. The B-G link or G-D link may not satisfy the intent. In our example, G-D link does not have sufficient bandwidth and will drop packets.

Solution

The present disclosure changes two aspects of the SR policy behavior to solve this problem:

1) The PCE 30 signals the intended path along with the SID list. The intended path is signaled in a new object (represented either in PCEP or in SR YANG model). It contains explicit list of routers and interfaces along the path. This is similar to the RSVP-TE ERO object. The SID list stays the same.

2) The head-end router marks a candidate path as invalid if it deviates from the intended path signaled. That is, the head-end router expands the SID list by computing the full list of segments, then it compares this expansion against the intended path it received from the SDN controller 20, it then marks the candidate path as invalid if the two paths do not match. Head-end router repeats this validity tests each time it runs SPF (usually due to a topology change).

The head-end router continues to use the highest-preference valid candidate path. However, it will now use additional criteria before declaring a candidate path as valid. FIG. 3 is a network diagram of the network 10 illustrating expansion of the SID list to detect divergence from the intended path.

For example, in FIG. 3, the network element 12A will receive both the SID lists for the network elements 12B, 12E, 12Z and the intended path 14 for the network elements 12A, 12B, 12D, 12E, 12Z. The network element 12A then expands the SID list for the network elements 12B, 12E, 12Z, and, because of the failure 34, this path is the network elements 12A, 12B, 12G, 12D, 12E, 12Z, and the network element 12A marks the first candidate path as invalid as it does not equal the intended path 14. As a result, it does not switch back in step 7 above to the primary path 32 forcing the traffic to stay on its backup path 16. Eventually, when the link between the network elements 12B, 12G is repaired, the network element 12A will expand the SID list for the network elements 12B, 12E, 12Z into the intended path 14—i.e., the network elements 12A, 12B, 12D, 12E, 12Z and mark the primary path 14 as valid and switch back.

There can be proprietary extensions to PCEP protocol and Netconf/YANG SR model for signaling the intended path. It is also possible to IETF standardization process.

Process for Handling Diversity Constraints with Segment Routing and a Centralized PCE FIG. 4 is a flowchart of a process 50 implemented in a network element 12A. The process 50 can be a method having steps implemented by the network element 12A, implemented by circuitry in the network element 12A, and as a non-transitory computer-readable medium storing instructions.

The process 50 includes, for a service, receiving a Segment Identifier (SID) list and an explicit list for an intended path in a Segment Routing network (step 51); expanding the SID list and comparing the expanded SID list to the explicit list (step 52); and setting the intended path as either valid or invalid based on the comparing (step 53).

The intended path can be a primary path, and wherein the steps further include receiving a SID list and an explicit list for a backup path in the Segment Routing network (step 54). The steps can further include switching to the backup path responsive to invalidity of the primary path (step 55); and switching back to the primary path responsive to it being valid (step 56).

The receiving can be from a Path Computation Element (PCE). The receiving can be from the network element which is a head-end router for the service. The SID list can be compressed, and the explicit list can include every network element for the intended path. The intended path can be valid when the expanded SID matches the explicit list.

Bandwidth Reservations With Segment Routing and Centralized PCE

Again, the present disclosure relates to systems and methods for handling bandwidth reservations with Segment Routing and a centralized Path Computation Element (PCE) under real-time topology changes. Of note, the bandwidth reservation approach can be used with the diversity constraints as well as separate, i.e., independent.

The bandwidth reservation is handled in the SDN controller 20 or the PCE 30 (which can be hosted by the SDN controller 20). A service request, along with the bandwidth reservation and other constraints, can be made via a northbound interface to the SDN controller 20. The SDN controller 20 manages the lifecycle of these services. The SDN controller 20 can host the PCE 30 and track available bandwidth on a model of the network topology it maintains. The available bandwidth is initialized according to the link capacity and quota as described below. Using the currently available bandwidth on the links, the PCE 30 computes paths for the service that satisfy the service's intent and have sufficient capacity. The SDN controller 20 updates the available bandwidth of the links along the path of the service by subtracting its reservation from the previously available link bandwidths.

This initial path is optimum with respect to the service intent at the time of its computation; that is, the PCE computes the best path available according to the network state and available capacity at that time. We call this the intended path of the service. The service will be placed on this path. We call the path the service is placed on as its provisioned path. At the start of the service, these two paths are the same, i.e., intended path=provisioned path. The service will take the provisioned path, but unforeseen changes in the network 10 may force it to take different paths after a while. We call this the service's current path. The topology and available capacity changes may also change the optimum path available in the network.

In summary, at a time t, the SDN controller 20 keeps track of four paths for a service:

| | |
|---|---|
| intended path | best known path prior to t-it can be called a "home base"; starts the same as provisioned path |
| provisioned path | the path the SDN controller 20 last-placed the service prior to t (signaling a SID list and this is a full extension of that path at the time the SID list was sent)-the network elements 12 only receive a compressed SID list for the provisioned path, however this can be augmented with the fully explicit path if the user wants to benefit from diversity behavior described above-the PCE 30 tracks the others |
| current path | the path the service is taking at t |
| optimum path | the path that is optimum according to topology and available bandwidth at t |

Note that the definitions of these paths do not depend on use of Segment Routing or RSVP-TE. Also, those skilled in the art will recognize that it is possible to use other names for the different paths, and some embodiments may include tracking less than all four paths.

The present disclosure contemplates the tracking of these defined paths for services in the network 10, to implement bandwidth reservations (traffic engineering) in Segment Routing.

For a new service, the SDN controller converts the provisioned path into a sequence of SIDs. This sequence of SIDs is said to be compressed in that it does not fully specify the path. In the most compressed case, it may use just a single SID for the tail-end of the service (e.g., SID list=12Z for a service from the network element 12A to the network element 12Z). In the most complete case, it can list every router and the link along the path. The most complete case is often not feasible due to the hardware limitations of routers. As a result, the compressed SID list ends up explicitly encoding some of the nodes and/or links of the path and implicitly specifying the nodes and/or links in between these explicit pieces. The implicit pieces are the shortest paths according to network's routing between the explicit pieces. The implicit pieces are the segments in the name Segment Routing. The compressed SID list is computed by the controller 20 so that, at time t, running shortest path between these SID will guarantee that current path chosen by routers will be same as the provisioned path. The present disclosure and its complexities apply with a compressed SID list, which is usually the case. With a fully specified SID list (every single link), the issue of path divergence and recalculating, etc. does not occur; however, the issue of link failure and PCE recalculating new path is still applicable to both.

In order to encode the provisioned path as a SID list, the SDN controller 20 needs to know the network topology and shortest path behavior to the same level of detail as the routers. To do this, it needs to participate in network's routing, such as ISIS and OSPF, and implement the same path computation as the routers. ISIS and OSPF topology can also be learned indirectly via another routing protocol, for example, by using the link state address family in BGP. The present disclosure allows either approach.

The SDN controller 20 then installs this SID list at the head-end router (e.g., the network element 12A in the following examples) of the path using either CLI, Netconf/Yang, or a signaling protocol such as PCEP and BGP. Note that the head-end router is only aware of the SID list, not the actual provisioned path. It also does not know the bandwidth reserved (nor has any use for this information). The head-end router will compute the path of the first segment, i.e., the shortest path to the first SID, and send the service's packets on this path. The router at the other end of that segment repeats the process for the next segment until all of the SID list is exhausted.

Figure 5:
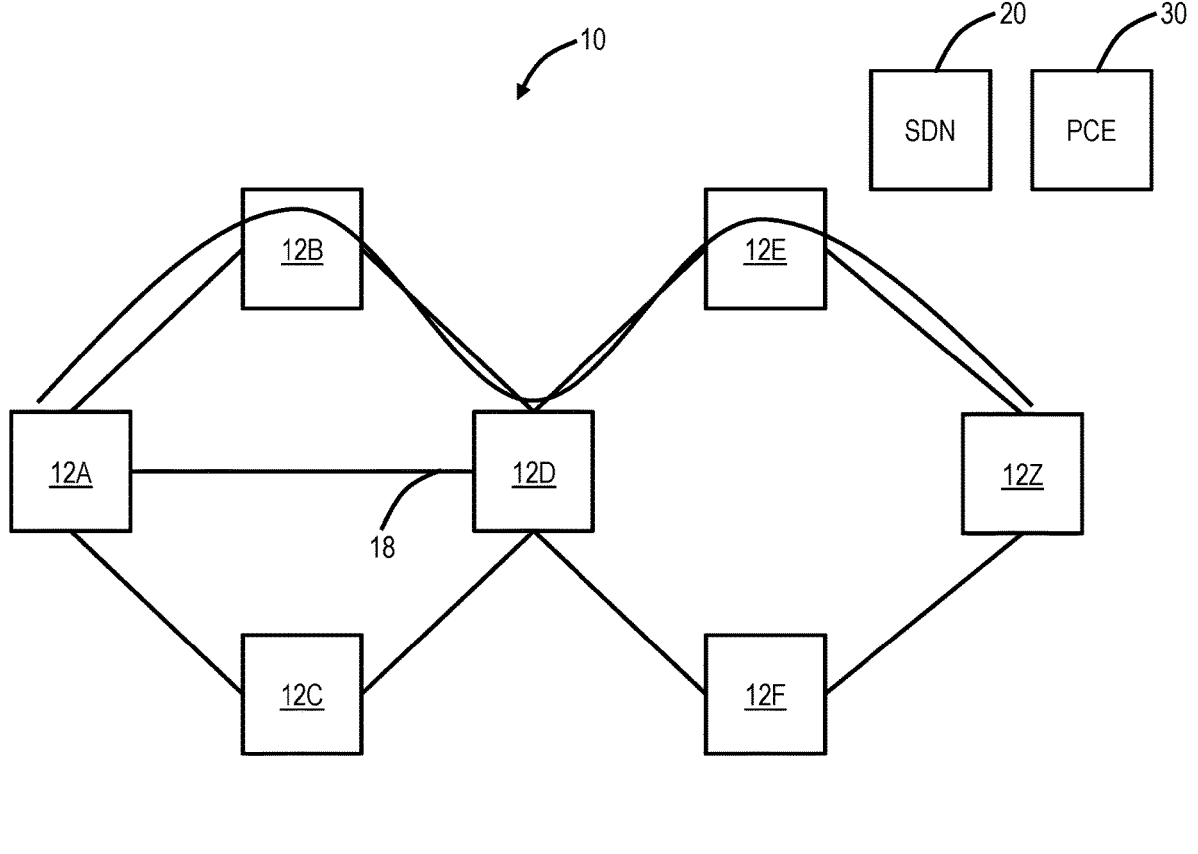
FIG. 5 is a network diagram of a network illustrating a path at service creation from the network element to the network element.

FIG. 5 is a network diagram of the network 10 illustrating a path 60 at service creation from the network element 12A to the network element 12Z. At the service creation, it is assumed the links 18 between the network elements 12A, 12C and the network elements 12C, 12D do not have enough bandwidth. As such, the intended path=optimum path=provisioned path, namely between the nodes A, B, D, E, Z. The SID list for the provisioned path may include [B, E, Z]. The link A-D is higher cost, to justify PCE not using it even though it looks shorter. Also assume the links A-C and D-F (not C-D) do not have enough bandwidth.

Because of the on-router computation of shortest paths, the service's current path and provisioned path may deviate after some link or router failures and/or repairs. This can happen as a result of a link or a router failure on the provisioned path, or without any failure on the provisioned path. In the latter case, the provisioned path is still available, but the SID list installed no longer encodes it correctly.

Figure 7:
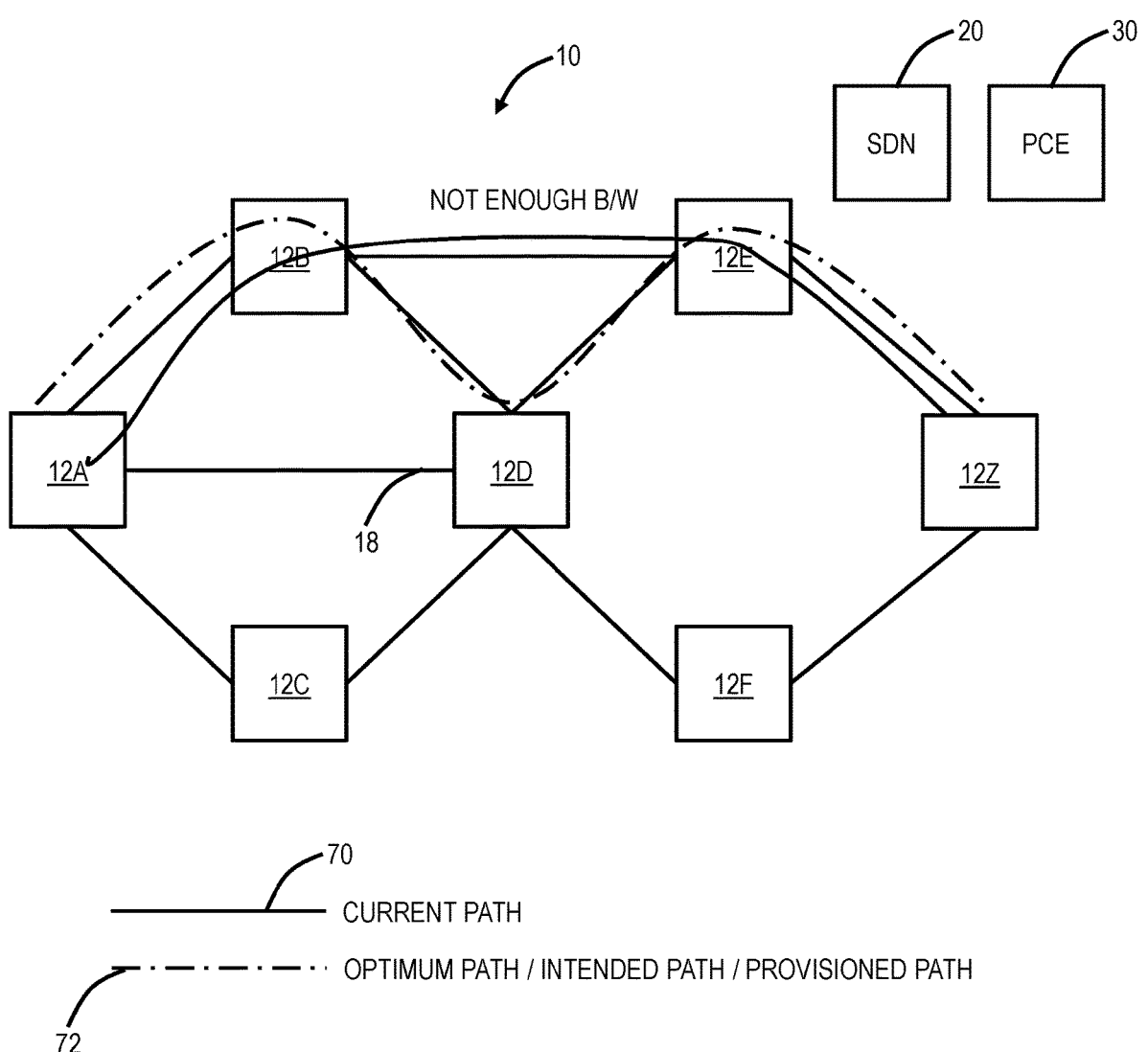
FIG. 7 is a network diagram of the network illustrating path divergence without a failure on the provisioned path.

FIG. 6 is a network diagram of the network 10 illustrating path divergence after a failure on the provisioned path, and FIG. 7 is a network diagram of the network 10 illustrating path divergence without a failure on the provisioned path.

In FIG. 6, there is an example failure on the link 18 between the network elements 12A, 12B. Because of this and due to the SID list=[B, E, Z], a current path 62 is routed as shown in FIG. 6, over the nodes [A, C, D, B, D, E, Z]. The intended path is kept the same (as home base as it is still best), but the provisioned path would be reflecting the new optimum path (A-D-E-Z). Of note, an optimum path 66 differs from the current path 62, namely [A, D, E, Z]. The SDN controller 20 can be configured to change the provisioned path to the new optimum path 66, such as via a SID list [A-D adjacency, E, Z].

In FIG. 7, there is no failure on a current path 70, but a new optimum path 72 may be available, e.g., based on a new link 18 between the network element 12B, 12E. Here, the SDN controller 20 can provide a new SID list [B, D, E, Z] based thereon.

In the present disclosure, the SDN controller 30 is configured to continuously monitor the network topology changes and recompute services' current path as represented by the SID list it last encoded. When the current path and the provisioned path differ, a corrective action needs to be taken. Otherwise, the service is consuming bandwidth on the links it did not reserve bandwidth on. This can impact the SLA for the service as well as other services. In our example in FIG. 6, the service starts to consume bandwidth on A-C, C-D, D-B links without actually reserving bandwidth on these links. It will cause congestion as well as packet drops on A-C and C-D links and impact other services.

When the adjustments are necessary, it also gives an opportunity to the SDN controller 20 to check whether there is a new optimum path and whether that is even better than the intended path. Our approach can prefer restoration into the new optimum path over the provisioned path (when still available), and if the optimum path is better than the intended path, it becomes the new intended path.

FIG. 8 is a network diagram of the network 10 illustrating a better intended path after a link addition. Here, a new link 18 is added between the network elements 12D, 12Z and now there is a new optimum path 74 that is changed to the intended path and the provisioned path, via a new SID list [B, Z].

Let's assume for a second that the provisioned path was the intended path (as it is initially) and a failure on the provisioned path caused the current path to diverge from it. Let's also assume the new optimum path is not better than the intended path. That is, the intended path is not available; we computed a new optimum path but that is not as good as the intended path. In this case, we will change the provisioned path to the new optimum path, but we will keep bandwidth reserved on both the intended path and provisioned path. This is because failures are often transient. If we let go of the bandwidth reservations on the intended path, another service may take away that capacity, and it may never be possible to move our service to its intended path after the intended path is repaired. If the link is taken out-of-service permanently, the intended path can be reset to the currently optimum path by operator input or by a timer which limits how long we are allowed to keep both reservations. When the provisioned path differs from the intended path, the SDN controller 20 needs to also monitor the availability of the intended path and move back the service to it. In our example in FIG. 6, we will keep the bandwidth reserved both on the failed intended path ([A, B, D, E, Z]) and on the new optimum path ([A, D, E, Z]). When the intended path and the new optimum path intersect, the bandwidth only needs to be reserved once on the common links (D-E, and E-Z links). If we were to relinquish reservation on the B-D link, some other service may take it and make it impossible for this service to restore on its intended path.

In addition to topology changes, the intended path may also change as new bandwidth becomes available on links freed by services that are terminated. This can be monitored either by monitoring service lifecycle at the SDN controller or can be checked periodically. An implementation can ensure in this case that the optimum path is better than the intended path by setting intended path's metric to infinity.

To recap, when the service starts, the intended path, the optimum path, the provisioned path, and the current path are the same. Afterwards, we watch (e.g., the SDN controller 20) for topology changes, bandwidth changes, optimization timers, and operator input. We then update the current path using the SID list provisioned and calculate a new optimum path. In addition, we have the intended path and the provisioned path from last iteration. We then check for a number of situations and take necessary actions:

1) If the optimum path is better than the intended path, changes to the network 10 now mean there is a better option than our earlier intended path. As a result, we would want to set the intended path to the new optimum path. We would also want to remove any reserved bandwidth on previous provisioned paths, update our provisioned path to the new intended path, and calculate new SID list for this new provisioned path.

2) If the optimum path is worse than the intended path, this means the intended path is not currently available due to a failure on it (or else our optimum path would have been the same or better). These failures can be transient, and we do not want to let go of bandwidth on the intended path as another service may come in and take that capacity, making it impossible to move back to the intended path once it is repaired. In the meantime, we will set the provisioned path to the optimum path, recalculate the SID list for this new provisioned path, and keep bandwidth reserved on both the intended path and the provisioned path paying attention to the common links. It is possible that if at some future time we detect the failure on the intended path is permanent, either due to a timer or operator intervention, we can update the intended path to the optimum path and remove the reserved bandwidth on the old, intended path except the links that are common to the current provisioned path.

3) If the optimum path ends up the same as the intended path but the provisioned path is different, this means we reserved bandwidth on a new optimum path when the intended path failed, but the intended path is now available again. In this case, we remove the reserved bandwidth on the provisioned path as it is no longer need except on the common links. We set the provisioned path to the intended path and recalculate the segments for the provisioned path. If none of the above occur, but the current path is different from the provisioned path, this means changes to the network have changed the path that results from the SID list; that is the currently encoded SID list no longer represent the provisioned path. In this case, we recalculate the new SID list for the provisioned path. Anytime the SID list changes, we signal it to the head-end router.

The present disclosure works with multiple classes of service (CoS) as well. We do not describe it here in detail. One way to support CoS is to treat each link as multiple links, one for each CoS. The link capacity is then spread, according to a policy, across these per CoS links. A service request for a CoS is then constrained to use only the links dedicated for this CoS.

It is not always desirable to use the full capacity of the links as high link utilization may not be acceptable for some service types. For this, service provider sets a quota for each link (the percent of link capacity available for each service type). For some services, this may be 100%. For some, such as low-delay, this may be a small number such as 30%. And for some services, oversubscription may be desired, and the quota can be set to 400% to donate 4*x* oversubscription. And with CoS, this is done at the component link level.

For IP networks, either RSVP-TE or Segment Routing (SR) can be used to setup these paths in the network. For RSVP-TE, the routers can handle computation of the path, maintenance of available bandwidth (for each CoS), distribution of available bandwidth to other routers, and signaling the actual path in the network for the customer to use. However, routers performing this functionality are limited to single-area IP networks. Multiple-area networks, and including single-area networks, can be supported using an external path computation engine (PCE). For SR, the PCE approach is the only viable approach as segment routing does not provide a mechanism to make reservations on the links, nor an ability to distribute available capacity of the links to the other routers in the network. The knowledge of available bandwidth and reservation behavior is the responsibility of the PCE and is not specified in the standards. Each PCE implements what they deem the best approach.

Segment Routing Bandwidth Reservation Process

FIG. 9 is a flowchart of a process 100 implemented in a controller 20 or PCE 30 for Segment Routing bandwidth reservation. The process 100 can be a method having steps implemented by the controller 20 or PCE 30, implemented by a processing device, and as a non-transitory computer-readable medium storing instructions.

The steps include receiving a request for a service in a Segment Routing network (step 101); determining an intended path for the service, provisioning a head-end node with a Segment Identifier (SID) list for the intended path, and reserving bandwidth for the service on the intended path (step 102); monitoring the Segment Routing network (step 103); and, responsive to a condition determined based on the monitoring, updating the SID list for the service and/or adjusting the BW accounting based on described cases above (step 104). The condition can include a current path for the service in the Segment Routing network differing from a provisioned path in the Segment Routing network.

The condition can include any of a failure in the Segment Routing network, a topology change in the Segment Routing network, bandwidth changes in the Segment Routing network, an optimization timer, and input from an operator. A failure will cause the current SID list to be revaluated. A topology change can create a better path (optimum path). Bandwidth changes can also create better paths. An optimization timer can be used for the service to periodically check if there is a better path. Finally, input from the operator can include requests to reserve bandwidth which also may change the optimum path. Of note, the process 100 is described with a single service. Those skilled in the art will recognize the process 100 can handle a significant number of services.

The steps can further include tracking a plurality of paths for the service, including any of the intended path, a provisioned path, a current path, and an optimum path (step 105). At service creation, all of the plurality of paths are the same. Responsive to the optimum path being better than the intended path, the steps can further include changing both the provisioned and intended path to the optimum path, computing a new SID list; and updating the reserved bandwidth. Responsive to the optimum path being worse than the intended path, the steps can further include maintaining the reserved bandwidth on the intended path; and setting a provisioned path to the optimum path with a corresponding SID list. The bandwidth reservations will be done on this new path (bandwidth on common links would only be reserved once). Responsive to the optimum path being the same as the intended path with the provisioned path being different, the steps can further include removing reserved bandwidth on the provisioned path and changing the provisioned path to the intended path and recalculating/updating new SID list for this new provisioned path. Responsive to the current path being the different from the provisioned path, the steps can further include determining a new SID list for the provisioned path.

In another embodiment, a Software Defined Networking (SDN) controller includes at least one processor and memory storing instructions that, when executed, cause the at least one processor to implement the process 100.

Routing Control Plane-Based Approach

MPLS-TP like behavior can be realized via SR Policies with two or more candidate paths. Often the first two of these candidate paths are diverse and bandwidth for the service is reserved on the links on these paths. There may be more candidate paths in the SR Policy. The goal is to keep the traffic on the candidate paths where bandwidth has been reserved and never to route them on links where bandwidth reservation has not been made. Hence, when a failure happens, we do not fix the candidate path but rather activate a different candidate path for which bandwidth has been reserved. If all such candidate paths fail, a fallback candidate path that simply follows network's default routing (IGP) with no bandwidth reservation may also be employed.

The present disclosure includes two flags as a new network element-level feature, one at the SR Policy level and one at the candidate path level. The configuration flag at the SR Policy level determines whether the revised candidate path selection behavior is desirable or not. This flag is called auto-reversion and when set to True (default), the SR Policy has the same behavior as the standard. The behavior of the candidate path selection algorithm is changed when this flag is set to False.

The second flag is at the candidate path level, and is called an eligibility flag. The candidate path selection logic is modified so that the network element only considers those candidate paths whose eligibility flag is set to True.

In an embodiment, the head-end router runs a liveness check mechanism (e.g., Bidirectional Forwarding Detection (BFD)) to determine any path failure either on all of the candidate paths or just the active candidate path. In another embodiment, there is no liveness check, but behavior is better when candidate paths are monitored. If BFD detects a failure of a candidate path, the eligibility flag is set (set to False), and the network element will no longer consider this candidate path in its best candidate path selection logic no matter what other link/node failures and repairs may happen in the network 10. This solves the problem of not using a path that "may not" be on its intended path.

Note that for BFD to detect link failures from the head-end it needs to run more frequently than link level BFD that triggers TI-LFA, or TI-LFA may be turned off for these services.

Meanwhile, the PCE 30 also listens to the topology changes in all the IGP areas in the network 10. After the failures have been repaired, the candidate paths that have been set as not eligible may revert to their intended paths. In this case, the PCE 30 (or the SDN controller 20) will clear eligibility flag of these candidate paths (set to True) to make them eligible for active candidate Path selection.

It is up to the network element configuration to reselect the paths after the PCE 30 makes candidate paths eligible again. The network element may revert immediately, or wait for a timer expiration, following another candidate path failure, or due to explicit request from the user or the SDN controller 20. However, if there was another failure that took the currently active candidate path down, any eligible candidate path must become eligible for selection.

The PCE 30 may also set the eligibility flag of candidate paths to False if the PCE 30 realizes the SID list, when expanded, is different from the intended path. This is particularly useful for keeping non-active candidate paths on their intended paths and avoids network element switching to a candidate path that is already invalid after another failure. However, if BFD is run over all candidate paths (active or inactive), this step is not necessary.

A rule of thumb in routing is to react to negative network events fast and positive network events slowly. By using the eligibility flag on the network element and by having the network element detecting the failure, the reaction to the change is as fast as possible. The PCE 30 then can take its time and reoptimize when repairs happen. A network element deals with its own SR Policies whereas the PCE 30 deals with all the SR policies in the network 10. This combination scales better.

Candidate Path Deviation

Note that, the candidate path may also deviate from its intended path without a failure. This can happen due to link/node repairs (assume other topology changes, e.g., link metric/attribute changes and network expansion, happen under the control of the SDN controller 20 and can be dealt). Unfortunately, BFD can only detect deviation from the intended path due to failures, not the ones due to repairs. The present disclosure has two mechanisms for dealing with this issue.

The first approach eliminates the problem by computing the paths in a model of the network 10 where all links and nodes that are currently down are brought up in the model. PCE uses this modified topology and determines the paths. As a result, some of the paths it computed may be down. It will install such paths with eligibility flag set to False, and hence the network elements will not pick them. When the path becomes available, the SDN controller 20 can clear the eligibility flag as before. This is simple but has a drawback. The paths installed initially by the SDN controller 20 are not immediately usable. However, there may not be much option here for some topologies, particularly access/aggregation network topologies. These topologies are often ring configurations (and rings of rings). When a link on a ring is down, there is not often a second path. Hence this simple approach is acceptable and may be preferred over the more complex solutions.

The second approach is similar to the PCE-based approaches described herein in that PCE only installs candidate paths that are available. But it continues to monitor these paths for repairs that may cause the installed SID list to deviate from the intended path. In this case, it can set the eligibility flag of these candidate paths to false, or it can take any of the steps outlined herein, including changing the SID list to re-match the intended path, or changing the intended path itself (in case current path is better than the intended path).

Figure 10:
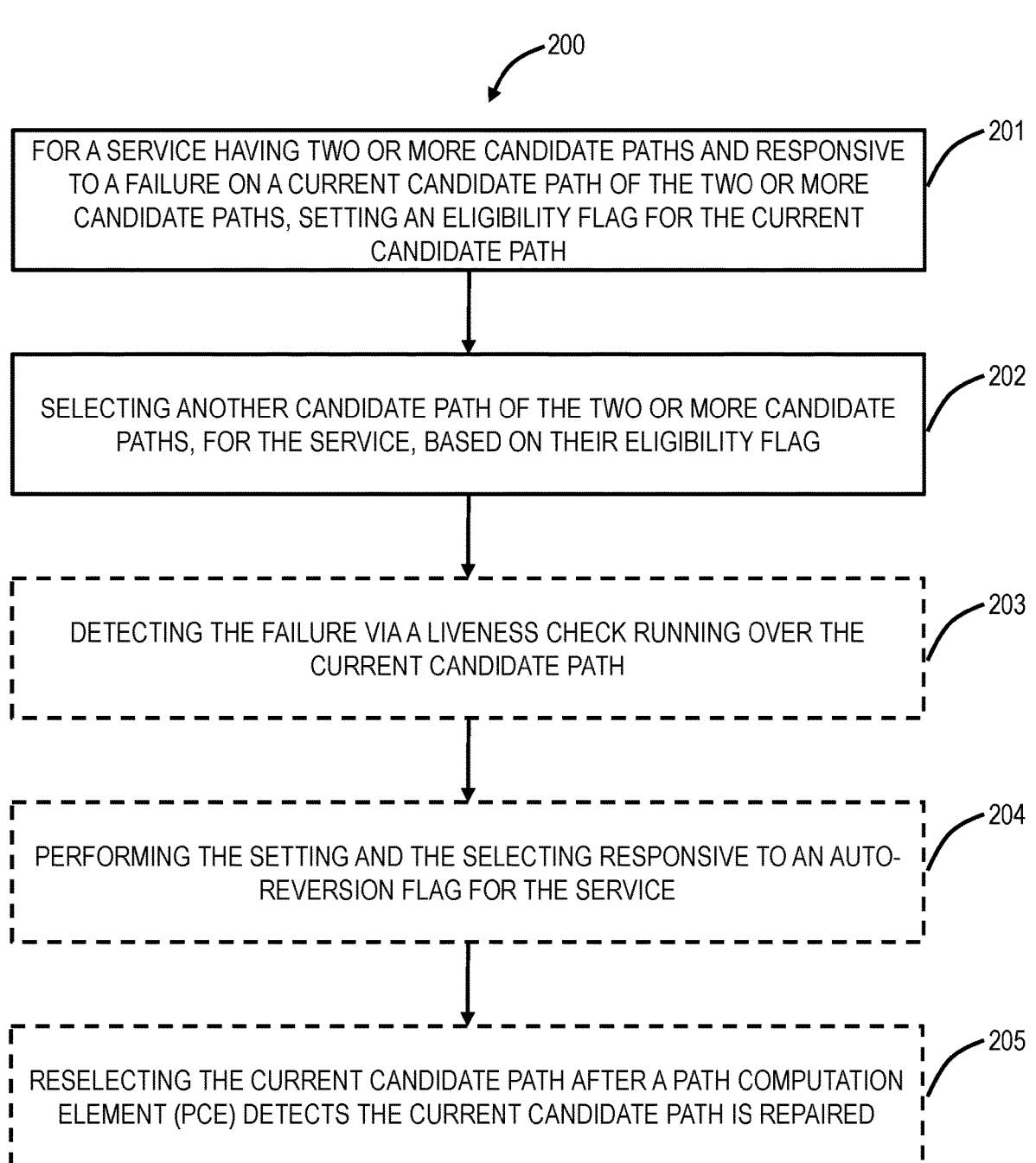
FIG. 10 is a flowchart of a process implemented in a network element in a Segment Routing network.

FIG. 10 is a flowchart of a process 200 implemented in a network element 12 in a Segment Routing network 10. The process 200 can be a method having steps implemented by the network element 12, implemented by a processing device, and as a non-transitory computer-readable medium storing instructions.

The process 200 includes, for a service having two or more candidate paths and responsive to a failure on a current candidate path of the two or more candidate paths, setting a eligibility flag for the current candidate path (step 201); and selecting another candidate path of the two or more candidate paths, for the service, based on their eligibility flag (step 202).

The process 200 can include detecting the failure via a liveness check running over the current candidate path (step 203). The process 200 can include performing the setting and the selecting responsive to an auto-reversion flag for the service (step 204). The eligibility flag for each of the two or more candidate paths can be set to True if an associated path is viable and False if there is the failure on the associated path. The setting can be performed subsequent to detection of the failure and the eligibility flag is changed by a Path Computation Element (PCE) after the failure is repaired The process 200 can include reselecting the current candidate path after a Path Computation Element (PCE) detects the current candidate path is repaired (step 205). Responsive to detecting any of the two or more candidate paths deviate from their intended path, an associated eligibility flag can be set to False. The process 200 can include performing a liveness check for all of the two of more candidate paths; and setting associated eligibility flag based on the liveness check.

CONCLUSION

Again, the present disclosure included systems and methods for handling bandwidth reservations with Segment Routing and a centralized PCE under real-time topology changes and systems and methods for handling diversity constraints with Segment Routing and a centralized PCE. Those skilled in the art will appreciate the bandwidth reservations and handling diversity constraints can be used together as well as independently and separately from one another. Further, the handling diversity constraints describes the PCE providing both a compressed SID list and an explicit list while the bandwidth reservation describes the PCE only providing the compressed SID list. Those skilled in the art will recognize that either approach can include both the compressed SID list and the explicit list.

Also, the routing control plane-based approach contemplates use with the bandwidth reservations and the handling diversity constraints described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A head-end node in a Segment Routing network comprising circuitry configured to:
   detect a failure of a Segment Routing policy which is between the head-end node and a destination in the Segment Routing network,
   set an eligibility flag for a candidate path associated with the Segment Routing policy to false,
   if one or more other candidate paths exist for the Segment Routing policy, switch to another candidate path that is marked eligible based on a corresponding eligibility flag set and for which bandwidth has been reserved to the destination, and
   receive updates from a Path Computation Engine (PCE) to change a setting of one or more of the eligibility flag and the corresponding eligibility flags.

2. The head-end node of claim 1, wherein the eligibility flag and the corresponding eligibility flags are maintained at least in part by the head-end node such that the head-end node selects a path based thereon.

3. The head-end node of claim 1, wherein the eligibility flag and the corresponding eligibility flags are set to either true or false based on whether a corresponding expanded Segment Identifier (SID) list matches a corresponding intended path.

4. The head-end node of claim 1, wherein the eligibility flag and the corresponding eligibility flags are set to either true or false based on updates in the Segment Routing network.

5. The head-end node of claim 1, wherein the eligibility flag and the corresponding eligibility flags are set to either true or false by one of the PCE and a Software Defined Networking (SDN) controller whereas the head-end node is only able to set the eligibility flag and the corresponding eligibility flags to false.

6. The head-end node of claim 1, wherein the one or more other candidate paths comprise multiple candidate paths each having a corresponding eligibility flag set to true, and wherein the head-end node is configured to select any one of these multiple candidate paths as the another candidate path.

7. A method implemented in a head-end node in a Segment Routing network comprising steps of:

detecting a failure of a Segment Routing policy which is between the head-end node and a destination in the Segment Routing network;

setting an eligibility flag for a candidate path associated with the Segment Routing policy to false;

if one or more other candidate paths exist for the Segment Routing policy, switching to another candidate path that is marked eligible based on a corresponding eligibility flag set and for which bandwidth has been reserved to the destination; and receiving updates from a Path Computation Engine (PCE) to change a setting of one or more of the eligibility flag and the corresponding eligibility flags.

8. The method of claim 7, wherein the eligibility flag and the corresponding eligibility flags are maintained at least in part by the head-end node such that the head-end node selects a path based thereon.

9. The method of claim 7, wherein the eligibility flag and the corresponding eligibility flags are set to either true or false based on whether an expanded Segment Identifier (SID) list for a corresponding path matches a corresponding intended path.

10. The method of claim 7, wherein the eligibility flag and the corresponding eligibility flags are set to either true or false based on updates in the Segment Routing network.

11. The method of claim 7, wherein the eligibility flag and the corresponding eligibility flags are set to either true or false by the PCE whereas the head-end node is only able to set the eligibility flag and the corresponding eligibility flags to false.

12. The method of claim 7, wherein the failure is detected using Interior Gateway Protocol (IGP) or using an Operations, Administration, and Maintenance (OAM) protocol.

13. A non-transitory computer-readable medium comprising instructions that cause one or more processors to:

monitor topology changes in a Segment Routing network, update corresponding eligibility flags for candidate paths for Segment Routing policies based on whether expanded versions of compressed Segment Identifier (SID) lists for the candidate paths match respective explicit intended paths previously provided to corresponding head-end nodes, and provide the updated corresponding eligibility flags for the candidate paths for the Segment Routing policies to corresponding head-end nodes in the Segment Routing network, updates from a Path Computation Engine (PCE) to change a setting of one or more of the corresponding eligibility flags, the corresponding head-end nodes configured to perform path switching in response to detecting path failures, wherein the switching is to another candidate path that is marked eligible based on the updated corresponding eligibility flags and for which bandwidth has been reserved to the destination.

14. The non-transitory computer-readable medium of claim 13, wherein the eligibility flags are maintained at least in part by the corresponding head-end nodes such that the corresponding head-end nodes only select a path based on the path's eligibility flag being true.

15. The non-transitory computer-readable medium of claim 13, wherein the instructions further cause the one or more processors to set the corresponding eligibility flags of the candidate paths to either true or false based on whether an expanded SID list for a corresponding candidate path of the candidate paths matches a corresponding intended path.

16. The non-transitory computer-readable medium of claim 13, wherein the instructions further cause the one or more processors to set the corresponding eligibility flags to either true or false.

17. The non-transitory computer-readable medium of claim 13, wherein the instructions further cause the one or more processors to for a given Segment Routing policy, compute an intended path based on a current state of the Segment Routing network, and provide a SID list based thereon.

18. The non-transitory computer-readable medium of claim 17, wherein the instructions further cause the one or more processors to detect a deviation where the SID list no longer matches the intended path and set the corresponding eligibility flag accordingly.

\* \* \* \* \*